(12) United States Patent
Akiba et al.

(10) Patent No.: US 11,187,600 B2
(45) Date of Patent: Nov. 30, 2021

(54) TORQUE SENSOR

(71) Applicant: DAI-ICHI SEIKO CO., LTD., Kyoto (JP)

(72) Inventors: Kazuto Akiba, Ogori (JP); Takahito Kamiuto, Ogori (JP); Akihiro Kuromaru, Ogori (JP)

(73) Assignee: DAI-ICHI SEIKO CO., LTD., Kyoto (JP)

( * ) Notice: Subject to any disclaimer, the term of this patent is extended or adjusted under 35 U.S.C. 154(b) by 233 days.

(21) Appl. No.: 16/464,379

(22) PCT Filed: Dec. 26, 2017

(86) PCT No.: PCT/JP2017/046670
§ 371 (c)(1),
(2) Date: May 28, 2019

(87) PCT Pub. No.: WO2018/124081
PCT Pub. Date: Jul. 5, 2018

(65) Prior Publication Data
US 2021/0131890 A1   May 6, 2021

(30) Foreign Application Priority Data

Dec. 27, 2016  (JP) .............................. JP2016-253414

(51) Int. Cl.
*G01L 3/10* (2006.01)
*B25J 19/02* (2006.01)
*G01L 5/00* (2006.01)

(52) U.S. Cl.
CPC .............. *G01L 3/101* (2013.01); *B25J 19/02* (2013.01); *G01L 5/0061* (2013.01)

(58) Field of Classification Search
CPC ......... G01L 3/10; G01L 5/0061; G01L 3/101; B25J 19/02
(Continued)

(56) References Cited

U.S. PATENT DOCUMENTS 5,969,268 A    10/1999  Sommerfeld et al.
7,093,477 B2    8/2006  Herbold et al.
(Continued)

FOREIGN PATENT DOCUMENTS

CN    102840944 A    12/2012
JP    H06-41892 B     6/1994
(Continued)

OTHER PUBLICATIONS

Extended European Search Report (EP Application No. 17886594.5-1001); dated Dec. 3, 2019; 10 pages.
(Continued)

*Primary Examiner* — Octavia Hollington
(74) *Attorney, Agent, or Firm* — Howard & Howard Attorneys PLLC

(57) ABSTRACT

A connector (130) is arranged between an inner support (110) and an outer support (120), and connects the inner support (110) and the outer support (120). A deformable body (140) has one end connected to the inner support (110) at a first position with respect to the direction of rotation about a Z-axis and the other end connected to the outer support (120) at a second position different from the first position, and is bent to be deformed in a radial direction by applying compressive force or tensile force between the first position and the second position. A detection body (150) includes a capacitative element including respective electrodes disposed to face the deformable body (140) and the outer support (120), and detects an elastic deformation generated in the deformable body (140) on the basis of the characteristic value of the capacitative element.

12 Claims, 5 Drawing Sheets

(58) Field of Classification Search
USPC .................................... 73/862.331–862.338
See application file for complete search history.

(56) References Cited

U.S. PATENT DOCUMENTS

| | | | |
|---|---|---|---|
| 7,520,182 | B2 | 4/2009 | Takamura et al. |
| 7,775,128 | B2 | 8/2010 | Roessingh et al. |
| 8,667,854 | B2 * | 3/2014 | Nishioki ................ G01L 3/10 73/862.337 |
| 10,209,151 | B2 | 2/2019 | Okada et al. |
| 2004/0003464 | A1 | 1/2004 | Herbold et al. |
| 2004/0003646 | A1 | 1/2004 | Herbold et al. |
| 2006/0130595 | A1 * | 6/2006 | Meyer .................. G01L 5/1627 73/862.041 |
| 2007/0180931 | A1 | 8/2007 | Takamura et al. |
| 2009/0259412 | A1 | 10/2009 | Brogardh |
| 2013/0167661 | A1 | 7/2013 | Nishioki et al. |
| 2016/0131216 | A1 | 5/2016 | Miyazaki |
| 2018/0209860 | A1 | 7/2018 | Okada et al. |

FOREIGN PATENT DOCUMENTS

| | | |
|---|---|---|
| JP | 2001500979 A | 1/2001 |
| JP | 4368353 B | 11/2009 |
| JP | 4397629 B | 1/2010 |
| JP | 2012037300 A | 2/2012 |
| JP | 5667723 B | 2/2015 |
| JP | 5687384 B | 3/2015 |
| JP | 6092326 B | 3/2017 |
| WO | 2007/096322 A2 | 8/2007 |

OTHER PUBLICATIONS

International Search Report (International Application No. PCT/JP2017/046670); dated Feb. 13, 2018; Includes English translation; 4 pages.

Notification of First Office Action (CN Application No. or Patent No. 201780078174.1): dated Jul. 2, 2020; 15 pages; Includes English Translation.

* cited by examiner

TORQUE SENSOR

CROSS-REFERENCE TO RELATED APPLICATIONS

This application is a national phase of International Patent Application No. PCT/JP2017/046670, filed Dec. 26, 2017, which claims priority to JP Patent Application No. 2016-253414, filed Dec. 27, 2016, the disclosures of which are hereby incorporated by reference in their entirety.

TECHNICAL FIELD

The present disclosure relates to a torque sensor.

BACKGROUND ART

Torque sensors detecting torque acting about rotation axes have been widely utilized in various transportation machines and industrial machines. For example, the following Patent Literature 1 discloses a sensor that outputs, as electric signals, an acting force component and an acting moment component by detecting a strain, generated in a ring-shaped load detection mechanism device, by a strain gauge. In addition, Patent Literature 2 discloses a sensor that outputs, as electric signals, an acting force component and an acting moment component by disposing plural radial members between a rigid central member and a rigid ring-shaped ring and by detecting a strain generated in the radial members.

Further, Patent Literature 3 discloses a sensor that outputs, as an electric signal, torque acting about a rotation axis by supporting a detection ring including a through-opening, into which a rotation axis is inserted, from both sides along the rotation axis by a support, and by detecting the elastic deformation of the detection ring by using a capacitative element. Patent Literature 4 discloses a sensor in which a balance between sensitivities of detection of force and moment can be adjusted while securing an internal space by adopting a structure in which plural detection rings are adjacently placed.

CITATION LIST

Patent Literature

Patent Literature 1: Examined Japanese Patent Publication No. H6-41892
Patent Literature 2: National Patent Publication No. 2001-500979
Patent Literature 3: Unexamined Japanese Patent Application Kokai Publication No. 2012-037300
Patent Literature 4: Japanese Patent No. 5667723

SUMMARY OF INVENTION

Technical Problem

Slim torque sensors including simple structures and having small thicknesses are desired in such uses that the torque sensors are attached to the joint portions of robot arms. However, it is structurally difficult to slim down hitherto proposed torque sensors.

For example, it is necessary to attach two rigid bodies to the ring-shaped load detection mechanism device in the sensor disclosed in the previously cited Patent Literature 1, and it is difficult to slim down the sensor. Moreover, since the sensor disclosed in Patent Literature 2 detects a strain generated in the radial members, the overall structure of the sensor is complicated, and it is unsuitable to slim down the sensor. It is difficult to slim down the sensors disclosed in the Patent Literature 3 and 4 because the sensors adopt structures in which the detection rings and the support are layered.

The present disclosure was made under such actual circumstances with an objective to provide a slim torque sensor including a simple structure and having a reduced thickness.

Solution to Problem

In order to achieve the objective described above, a torque sensor according to the present disclosure is a torque sensor that detects torque, about a rotation axis, generated between a first object and a second object, the torque sensor including:

a first support that supports the first object;

a second support that supports the second object, the second support being located outwardly from the first support with respect to a radial direction about the rotation axis and arranged across a space from the first support;

a plurality of connectors that are arranged between the first support and the second support and connect the first support and the second support;

a sheet-shaped deformable body that is arranged in a space surrounded by (i) the first support, (ii) the second support, and (iii) two connectors adjacent to each other of the plurality of connectors, the deformable body having one end connected to the first support at a first position with respect to a rotation direction about the rotation axis and another end connected to the second support at a second position different from the first position with respect to the rotation direction, and the deformable body being bent to be deformed in the radial direction by applying compressive force or tensile force between the first position and the second position; and a detection body that detects an elastic deformation generated in the deformable body, based on a characteristic value of either a probe disposed between the deformable body and the first support or a probe disposed between the deformable body and the second support.

The detection body may include a capacitative element including either respective electrodes disposed to face the deformable body and the first support or respective electrodes disposed to face the deformable body and the second support, and may detect an elastic deformation generated in the deformable body, based on a characteristic value of the capacitative element.

In such a case, the first support, the second support, the connectors, the deformable body, and the detection body may be arranged along a two-dimensional plane orthogonal to the rotation axis.

The deformable body may include:

a sheet-shaped first protrusion body that protrudes from a plane of the first support toward the second support, the plane of the first support facing the second support;

a sheet-shaped second protrusion body that protrudes from a plane of the second support toward the first support, the plane of the second support facing the first support; and a sheet-shaped extension body that is connected to a leading end of the first protrusion body and a leading end of the second protrusion body and that is extended along the rotation direction of the rotation axis.

A width of the first protrusion body and a width of the second protrusion body each may be less than a width of each connector with respect to the rotation direction.

The deformable body may include:

a first deformable body that is orthogonal to the rotation axis and arranged in a first quadrant of a two-dimensional orthogonal coordinate system of which an origin point is a position of the rotation axis;

a second deformable body that is arranged in a second quadrant of the two-dimensional orthogonal coordinate system;

a third deformable body that is arranged in a third quadrant of the two-dimensional orthogonal coordinate system; and a fourth deformable body that is arranged in a fourth quadrant of the two-dimensional orthogonal coordinate system.

The detection body may include:

a first detection body that detects an elastic deformation of the first deformable body;

a second detection body that detects an elastic deformation of the second deformable body;

a third detection body that detects an elastic deformation of the third deformable body; and a fourth detection body that detects an elastic deformation of the fourth deformable body.

The detection body may include:

a first electrode that is disposed on the deformable body; and a second electrode that is disposed on the first support to face the first electrode.

The detection body may include:

a third electrode that is disposed on the deformable body; and a fourth electrode that is disposed on the second support to face the third electrode.

The connectors each may have a portion of which a width in the rotation direction is less than that of another portion, between a connection portion to the first support and a connection portion to the second support.

The first support, the second support, the connectors, and the deformable body may be integrated into one member; and the respective outer edges of a portion that connects the first support and the connectors, a portion that connects the second support and the connectors, a portion that connects the first support and the deformable body, and a portion that connects the second support and the deformable body may be formed to have an arc shape.

Advantageous Effects of Invention

According to the present disclosure, a first support and a second support are connected through plural connectors. Moreover, a deformable body is arranged in a space surrounded by connectors adjacent to each other, the first support, and the second support. A probe in a detection body is disposed between the deformable body and the first support or between the deformable body and the second support. As a result, all the components can be arranged along a plane, and a slim torque sensor including a simple structure and having a reduced thickness can be achieved.

DESCRIPTION OF EMBODIMENTS

Embodiment 1

First, Embodiment 1 of the present disclosure will be described in detail with reference to FIG. 1A to FIG. 4.

Figure 1A:
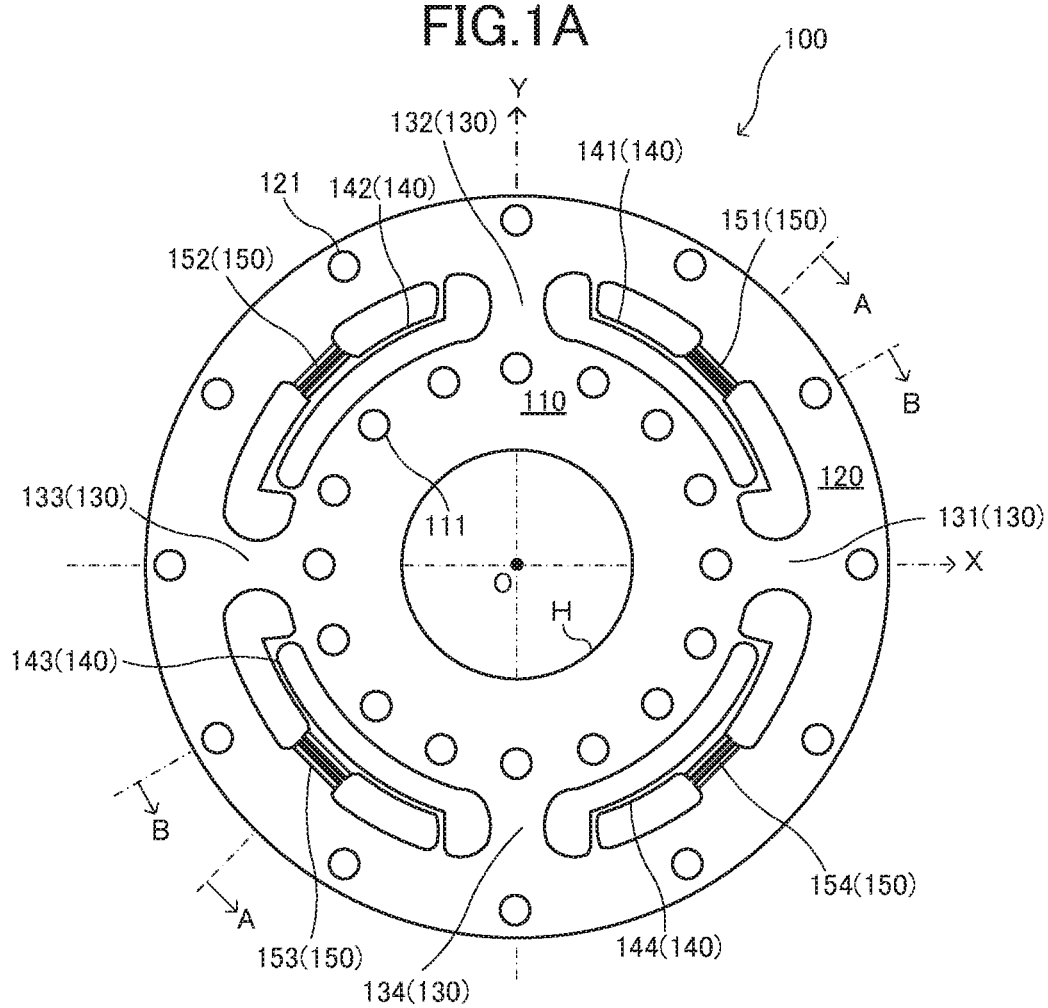
FIG. 1A is a top view of a torque sensor according to Embodiment 1 of the present disclosure.

As illustrated in FIG. 1A, the shape of a basic structure 100 included in the main structure section of a torque sensor according to the present embodiment is generally a disk shape. Herein, for convenience in description, an XYZ three-dimensional orthogonal coordinate system of which the origin point O is the center position of the torque sensor is defined as illustrated in the figure, and the structure of each section is described on the presumption that the torque sensor is arranged in the coordination system. In the case of FIG. 1A, the X-axis is defined as the right direction of the figure, the Y-axis is defined as the upward direction of the figure, and the Z-axis is defined as a vertically frontward direction with respect to the paper. The torque sensor is arranged so that the Z-axis is the central axis of the torque sensor. The Z-axis is the rotation axis of the torque sensor, and the torque sensor detects torque acting about the rotation axis. The rotation axis is a virtual axis for defining the detected torque.

As illustrated in FIG. 1A, the basic structure 100 includes: an inner support 110 of which the center is located at the origin point O, and which supports a first object; and an outer support 120 that is arranged to surround the outside of the inner support 110 and that supports a second object. The inner support 110 is a ring-shaped structure including a center in which a hollow H (through-hole) is formed, and the outer support 120 is a ring-shaped structure arranged on the periphery of the inner support 110. The outer support 120 is arranged across a space from the inner support 110 with respect to a radial direction about the Z-axis.

Examples of "ring" are not limited to "circular ring" but include "square ring" and "ring having optional shape". For example, a support having a shape which is "square-ring shape", or a "hexagonal ring-shaped" or "octagonal ring-shaped" support may be used as the inner support 110 or the outer support 120.

The basic structure 100 further includes four connectors 130. Each connector 130 is arranged between the inner support 110 and the outer support 120, and connects the inner support 110 and the outer support 120. Specifically, each connector 130 connects the outer side of the inner support 110 and the inner side of the outer support 120. In the basic structure 100, a first connector 131 arranged on the X-axis in the positive side, a second connector 132 arranged on the Y-axis in the positive side, a third connector 133 arranged on the X-axis in the negative side, and a fourth connector 134 arranged on the Y-axis in the negative side are disposed as the connectors 130, and hereinafter, also simply referred to as "connectors 131, 132, 133, and 134", as appropriate. The connectors 131 to 134 allow the flat sheet-shaped basic structure 100 to be strong against, for example, force acting to deform the basic structure 100.

The basic structure 100 further includes: four sheet-shaped deformable bodies 140; and detection bodies 150 disposed on the deformable bodies 140, respectively. Each deformable body 140 and each detection body 150 are disposed to detect torque acting about the Z-axis. Each deformable body 140 and each detection body 150 are arranged in a space surrounded by the inner support 110, the outer support 120, and two connectors 130 adjacent to each other.

Figure 1B:
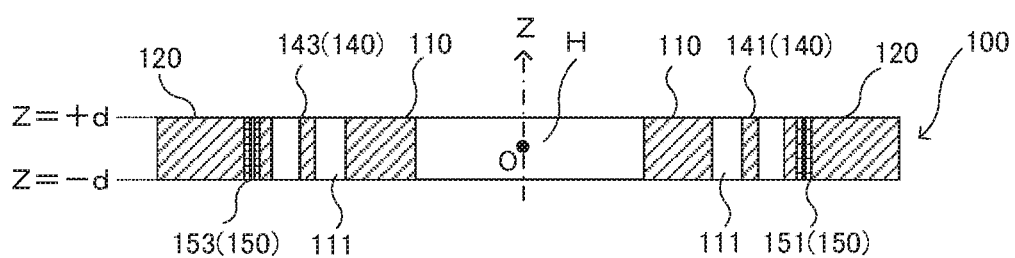
FIG. 1B is a cross-sectional view taken along the plane A-A of the torque sensor.
Figure 1C:
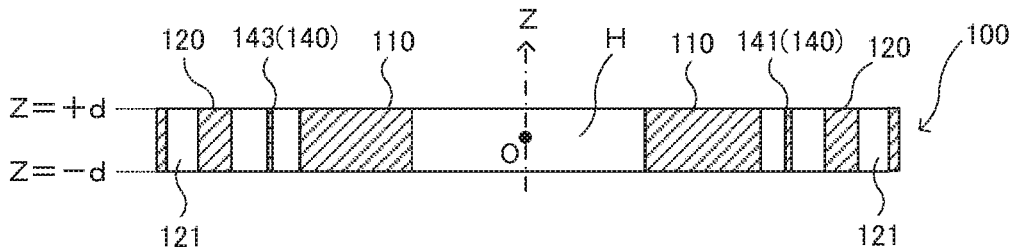
FIG. 1C is a cross-sectional view taken along the plane B-B of the torque sensor.

Holes for attachment 111 are disposed in 16 places in the inner support 110. Similarly, holes for attachment 121 are disposed in 12 places in the outer support 120. As illustrated in FIG. 1B and FIG. 1C, the holes for attachment 111, 121 are holes drilled vertically (in the Z-axis direction) in a manner similar to the manner of the hollow H.

The torque sensor is optimal for such a use that the torque sensor is attached to a joint portion of a robot arm. For example, when a first arm section (first object) is arranged in the lower area (−Z side) of the basic structure 100 illustrated in FIG. 1B, and a second arm section (second object) is arranged in the upper area (+Z side) of the basic structure 100, the basic structure 100 functions as a joint member that connects both the arm sections. The holes for attachment 111, 121 are used as holes for insertion of a bolt for attaching the basic structure 100 to each arm section. For example, when the inner support 110 is attached to the first arm section arranged in the lower area by bolts inserted into the holes for attachment 111, and the outer support 120 is attached to the second arm section arranged in the upper area by bolts inserted into the holes for attachment 121, torque about the rotation axis, generated between the first arm section and the second arm section, can be detected. As a matter of course, thread-grooves may be formed on the inner surfaces of the holes for attachment 111, 121, as needed.

The holes for attachment 111, 121 are not components essential for the torque sensor, and do not perform a direct function for detecting torque in the principle of operation. For example, the need of the holes for attachment 111, 121 is eliminated by performing the connection to the arm sections through the adoption of an adhesion method using no bolt.

Figure 2:
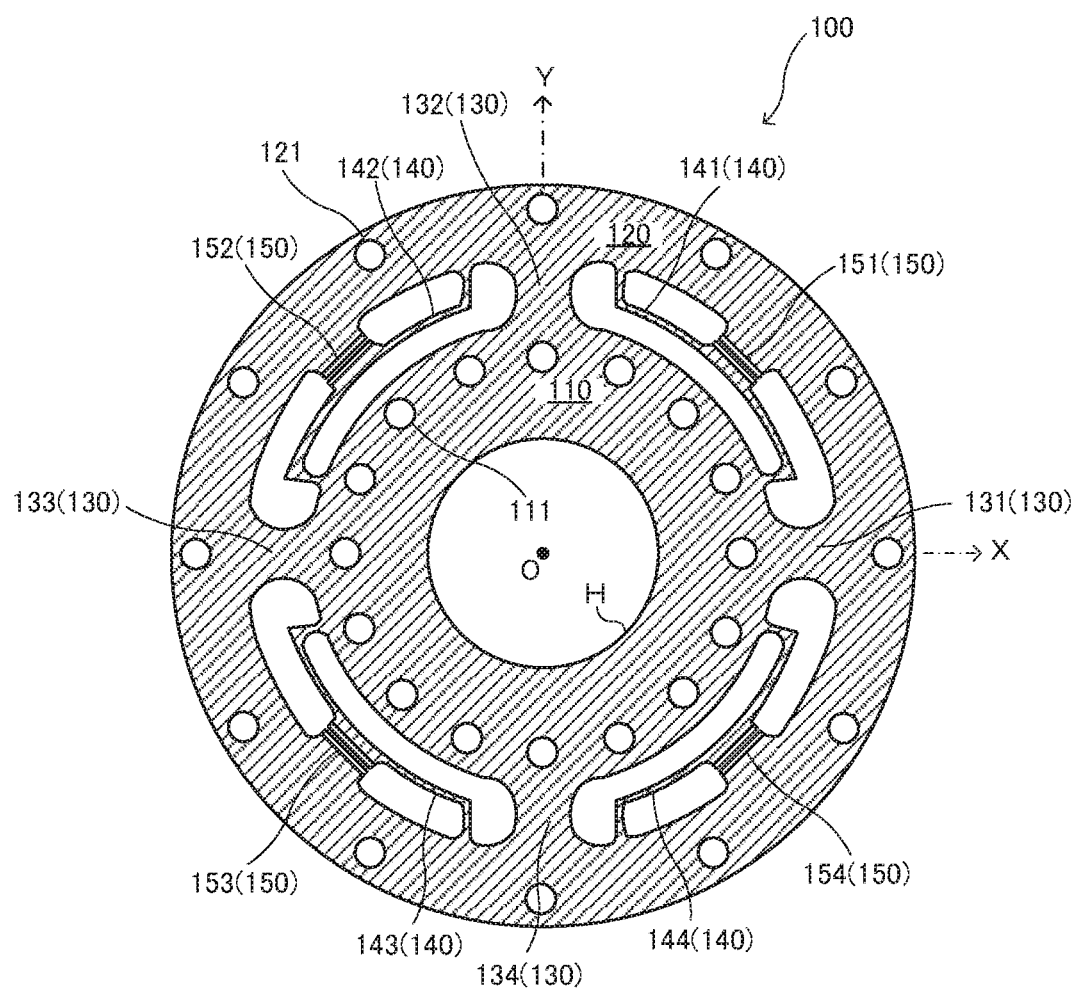
FIG. 2 is a transverse cross-sectional view taken along the plane XY of the basic structure of the torque sensor illustrated in FIG. 1A.

FIG. 2 is a transverse cross-sectional view taken along the plane XY of the basic structure 100 of the torque sensor illustrated in FIG. 1A. The basic structure 100, which is one disk-shaped structure, is formed by subjecting a metal sheet including iron, stainless steel, aluminum, or the like to working by wire cutting. The basic structure 100 may be formed by subjecting a metal sheet to cutting working (for example, working with a milling cutter). In the present embodiment, the sections of the basic structure 100 are referred to as the inner support 110, the outer support 120, the connectors 130, the deformable bodies 140, and the detection bodies 150, respectively, with focusing on the functions of the sections.

Figure 3:
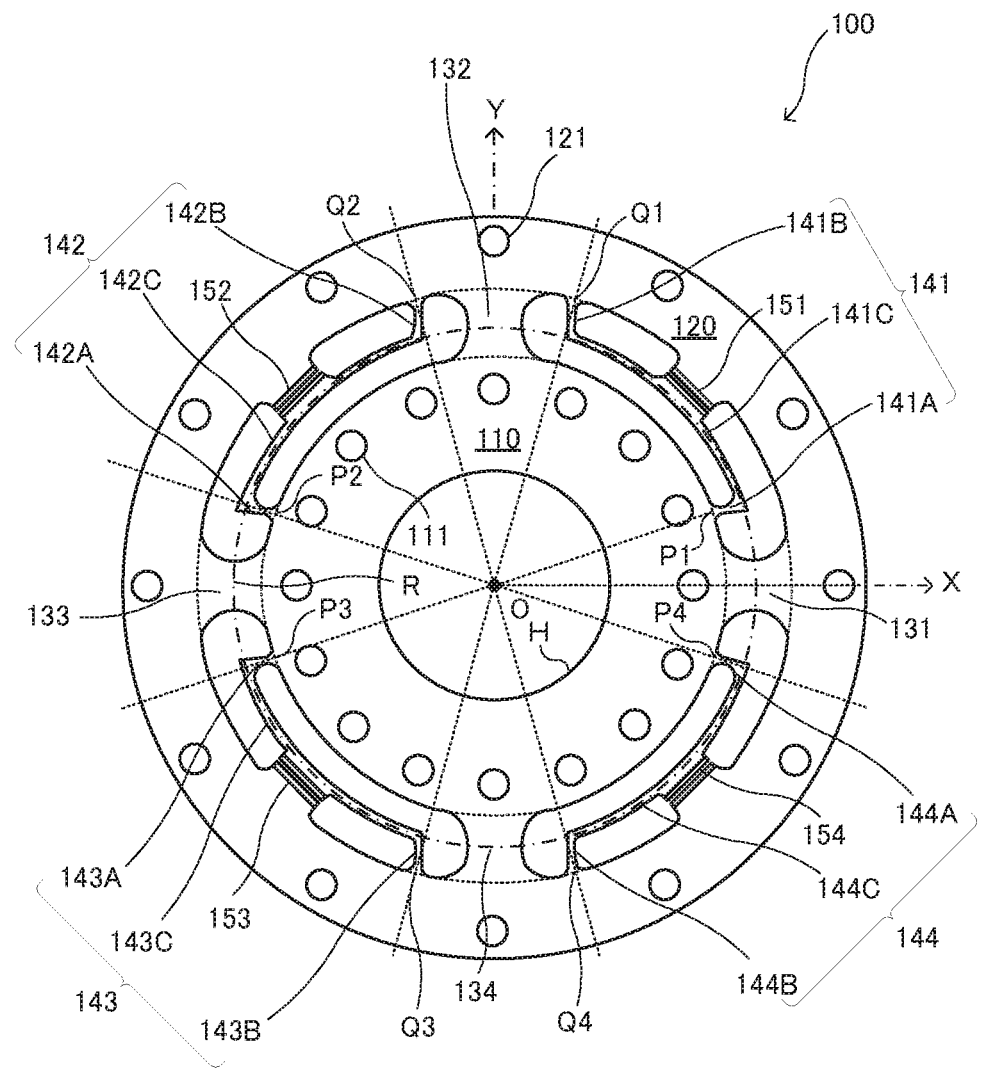
FIG. 3 is a top view illustrating each partitioned section of the basic structure.

FIG. 3 illustrates each section of the basic structure 100, partitioned by dotted lines. The structure of each section of the basic structure 100 will be described below in more detail with reference to FIG. 3.

First, the inner support 110 disposed in the center is a member including a center in which the circular hollow H is formed. The hollow H is not essential but is preferably disposed in practice. This is because the formation of the hollow H in the center enables various members (for example, wiring for extracting electric signals) to be inserted into the hollow H, as needed.

The basic structure 100 includes, a first deformable body 141, a second deformable body 142, a third deformable body 143, and a fourth deformable body 144 as the deformable bodies 140. The first deformable body 141 is sandwiched between the first connector 131 and the second connector 132, and is located in the first quadrant of an XY coordination system (two-dimensional orthogonal coordinate system). The second deformable body 142 is sandwiched between the second connector 132 and the third connector 133, and is located in the second quadrant of the XY coordination system. The third deformable body 143 is sandwiched between the third connector 133 and the fourth connector 134, and is located in the third quadrant of the XY coordination system. The fourth deformable body 144 is sandwiched between the fourth connector 134 and the first connector 131, and is located in the fourth quadrant of the XY coordination system. Hereinafter, the deformable bodies are also simply referred to as "deformable bodies 141, 142, 143, and 144", as appropriate.

One ends of the four deformable bodies 141, 142, 143, and 144 are connected to the inner support 110 at first positions (inner support points) P1, P2, P3, and P4, respectively, with respect to the rotation direction about the Z-axis. Moreover, the other ends of the deformable bodies 141, 142, 143, and 144 are connected to the outer support 120 at second positions (outer support points) Q1, Q2, Q3, and Q4 different from the first positions P1, P2, P3, and P4, respectively, with respect to the rotation direction about the Z-axis. The deformable bodies 141, 142, 143, and 144 have shapes that are bent to be radially deformed by applying compressive force or tensile force between the first positions P1, P2, P3, and P4 and the second positions (outer support points) Q1, Q2, Q3, and Q4.

More specifically, the first deformable body 141 includes a first protrusion body 141A, a second protrusion body 141B, and an extension body 141C. Similarly, the second deformable body 142 includes a first protrusion body 142A, a second protrusion body 142B, and an extension body 142C, the third deformable body 143 includes a first protrusion body 143A, a second protrusion body 143B, and an extension body 143C, and the fourth deformable body 144 includes a first protrusion body 144A, a second protrusion body 144B, and an extension body 144C. The first protrusion bodies 141A to 144A are sheet-shaped members that protrude from a surface, facing the outer support 120, of the inner support 110 toward the outer support 120. The second protrusion bodies 141B to 144B are sheet-shaped members that protrude from a surface, facing the inner support 110, of the outer support 120 toward the inner support 110. The extension bodies 141C to 144C are sheet-shaped members that are connected to leading ends of the first protrusion bodies 141A to 144A of the inner support 110 and to leading ends of the second protrusion bodies 141B to 144B of the outer support 120 and that are extended along the direction of rotation of which the rotation axis is the Z-axis. The extension bodies 141C to 144C extend along the circumference of a circle R about the origin point O.

The deformable body 141 and the deformable body 143 are point-symmetric with respect to the origin point O as the point of the symmetry, and the deformable body 142 and the deformable body 144 are point-symmetrical with respect to the origin point O as the point of the symmetry. Moreover, the deformable bodies 141, 142 and the deformable bodies 144, 143 are line-symmetric with respect to the X-axis as a symmetry axis, and the deformable bodies 141, 144 and the deformable bodies 142, 143 are line-symmetric with respect to the Y-axis as a symmetry axis. The arrangement of the deformable bodies 141 to 144 in such a manner enables the torque sensor to detect clockwise torque and counterclockwise torque about the Z-axis.

The widths of the first protrusion bodies 141A to 144A and the widths of the second protrusion bodies 141B to 144B are less than the widths of the connectors 130 with respect to the direction of the rotation of which the rotation axis is the Z-axis. As a result, the deformable bodies 141 to 144 are more easily deformed than the connectors 130.

The four extension bodies 141C, 142C, 143C, and 144C are sheet-shaped members having small radial thicknesses, as described above. Moreover, the extension bodies are portions without the connection of the connectors 130 and therefore greatly elastically deformed due to the action of torque. Ridges that slightly outwardly convexly rise with respect to the origin point O are formed on the central portions of the extension bodies 141C, 142C, 143C, and 144C. Each of the ridges is intended to offer convenience for forming a displacing electrode as described below, and is not necessary in the detection principle of the present disclosure.

As a matter of course, the basic structure 100 is an integral structure including a consistent material, and the formation of the integral structure with a metal such as, for example, iron, stainless steel, or aluminum allows elastic deformations to be generated in all the portions due to the action of torque. However, the elastic deformations generated in the inner support 110, the outer support 120, and the connectors 130 are slighter than the elastic deformation generated in each deformable body 140.

The basic structure 100 includes four detection bodies 151 to 154 as the detection bodies 150. The four detection bodies 151 to 154 have the function of electrically detecting elastic deformations generated in the deformable bodies 141 to 144. All the detection bodies include a capacitative element. In other words, the detection bodies 151 to 154 include capacitative elements in which displacing electrodes formed on the outer sides of the deformable bodies 141 to 144 and fixed electrodes formed on the inner side of the outer support 120 are allowed to face each other. In other words, the detection bodies 151 to 154 include the capacitative elements including the electrodes disposed to face the deformable bodies 141 to 144 and the outer support 120. Torque about the Z-axis is generated as elastic deformations in the deformable bodies 141 to 144 and is expressed as the characteristic values of the capacitative elements.

The respective outer edges of portions that connect the inner support 110 and the connectors 130, portions that connect the outer support 120 and the connectors 130, portions that connect the inner support 110 and the deformable bodies 140, and portions that connect the outer support 120 and the deformable bodies 140 are formed to have an arc shape in order to relieve stress concentration.

Subsequently, the detection operation of the torque sensor illustrated in FIG. 1A will be described with reference to FIG. 4.

Displacing electrodes (first electrodes) E11, E12, E13, and E14 are disposed at four places on the outer sides of the extension bodies 141C, 142C, 143C, and 144C, respectively, and fixed electrodes (second electrodes) F11, F12, F13, and F14 are disposed at four places on the inner side of the outer support 120, respectively.

More specifically, the displacing electrode E11 is disposed on the ridge of the outer side of the extension body 141C, and the fixed electrode F11 facing the displacing electrode E11 is disposed on the facing surface of the outer support 120. The electrodes E11, F11 in a pair are included in a capacitative element. The first detection body 151 is nothing but the capacitative element.

In addition, the displacing electrode E12 is disposed on the ridge of the outer side of the extension body 142C, and the fixed electrode F12 is disposed on the facing surface of the outer support 120. The displacing electrode E12 and the fixed electrode F12 are included in a capacitative element which is the second detection body 152. Similarly, the displacing electrode E13 is disposed on the ridge of the outer side of the extension body 143C, and the fixed electrode F13 is disposed on the facing surface of the outer support 120. The displacing electrode E13 and the fixed electrode F13 are included in a capacitative element which is the third detection body 153. In addition, the displacing electrode E14 is disposed on the ridge of the outer side of the extension body 144C, and the fixed electrode F14 is disposed on the facing surface of the outer support 120. The displacing electrode E14 and the fixed electrode F14 are included in a capacitative element which is the fourth detection body 154. Hereinafter, the detection bodies are also simply referred to as "detection bodies 151, 152, 153, and 154", as appropriate.

Insulating substrates (white-painted portions in FIG. 2) are inserted between the ridges of the outer sides of the extension bodies 141C, 142C, 143C, and 144C and the corresponding displacing electrodes E11 to E14, and insulating substrates (white-painted portions in FIG. 2) are inserted between the outer support 120 and the corresponding fixed electrodes F11 to F14. The reason why the respective electrodes are formed via the insulating substrates as described above is because in this embodiment, the basic structure 100 includes the integral structure including a metal as illustrated in FIG. 2, and it is necessary to allow the individual electrodes to be electrically independent. Accordingly, when the basic structure 100 is formed of an insulating material such as resin, it is not necessary to dispose any insulating substrate.

Figure 4:
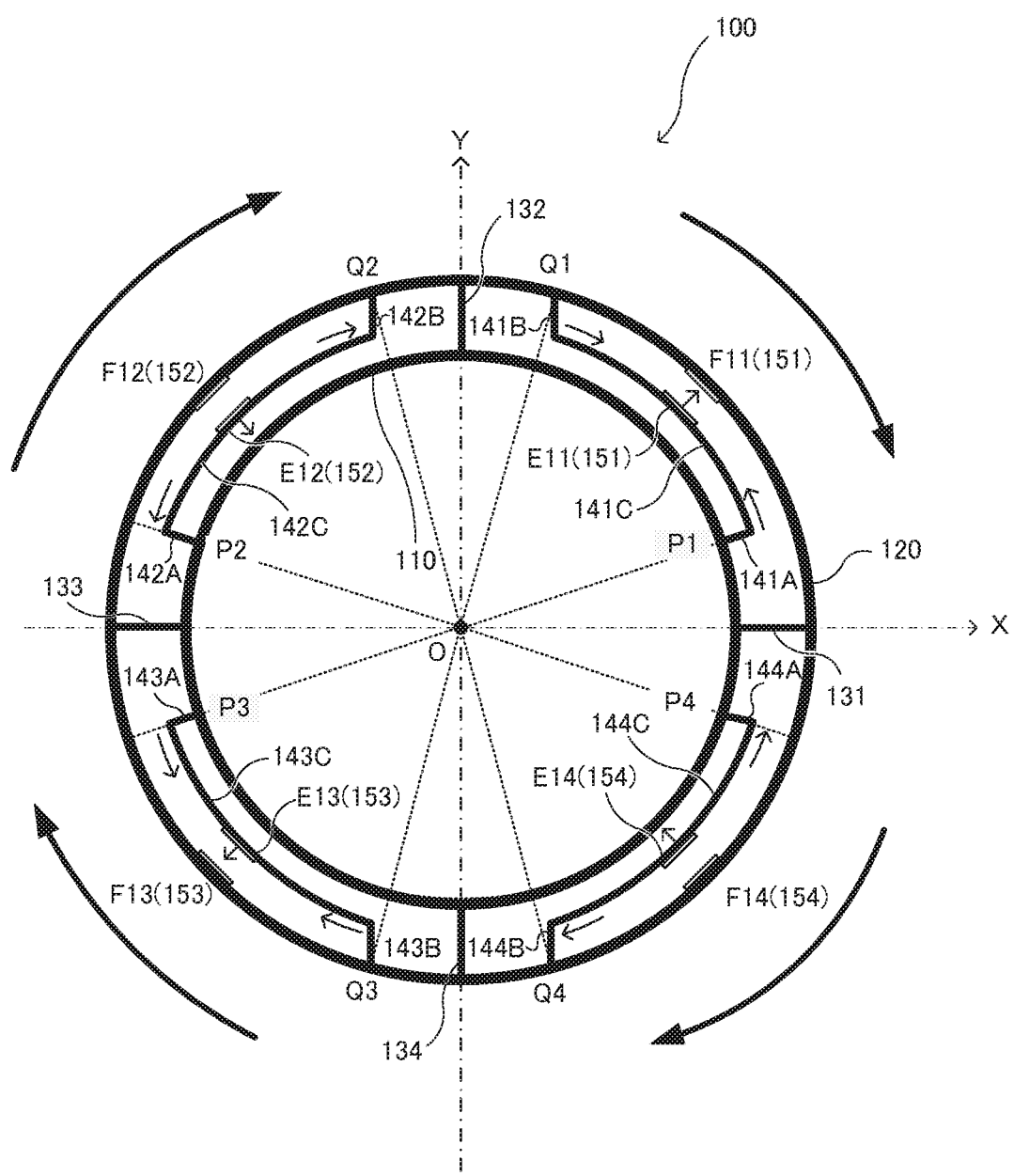
FIG. 4 is a view illustrating a detection operation of the torque sensor.

As illustrated in FIG. 4, the inner support points P1, P2, P3, and P4 which are connection points between the inner support 110 and the deformable bodies 141, 142, 143, and 144, and the outer support points Q1, Q2, Q3, and Q4 which are connection points between the outer support 120 and the deformable bodies 141, 142, 143, and 144 will now be defined for convenience in description of the detection operation of the torque sensor.

It will be considered what kind of deformation is generated in the deformable bodies 141, 142, 143, and 144 when clockwise moment (torque) about the Z-axis as a rotation axis acts on the outer support 120 as indicated by arrows in FIG. 4 in the state of fixing the inner support 110. In this case, the inner support points P1, P2, P3, and P4 are connected to the inner support 110, and are therefore fixed points. In contrast, the outer support points Q1, Q2, Q3, and Q4 are connected to the outer support 120, and receive the action of clockwise rotational force when clockwise torque acts on the outer support 120.

Thus, for example, the point Q1 moves to approach the point P1, and therefore, the first deformable body 141 (extension body 141C) is deformed to radially outwardly swell. Similarly, the point Q3 moves to approach the point P3, and therefore, the third deformable body 143 (extension body 143C) is also deformed to radially outwardly swell. As a result, the displacing electrode E11 approaches the fixed electrode F11, and the capacitance value C1 of the capacitative element (first detection body 151) including both the electrodes is increased. Similarly, the displacing electrode E13 approaches the fixed electrode F13, and the capacitance value C3 of the capacitative element (third detection body 153) including both the electrodes is also increased.

In contrast, the point Q2 moves away from the point P2, and therefore, the second deformable body 142 (extension body 142C) is deformed to be radially inwardly dented. Similarly, the point Q4 moves away from the point P4, and therefore, the fourth detection body 144 (extension body 144C) is also deformed to be radially inwardly dented. As a result, the displacing electrode E12 moves away from the fixed electrode F12, and the capacitance value C2 of the capacitative element (the second detection body 152) including both the electrodes is decreased. Similarly, the displacing electrode E14 moves away from the fixed electrode F14, and the capacitance value C4 of the capacitative element (fourth detection body 154) including both the electrodes is decreased.

When counterclockwise moment (torque) about the Z-axis as a rotation axis acts on the outer support 120 in the state of fixing the inner support 110, movement reversed with respect to the movement described above occurs, and the capacitance values C1 to C4 indicate variations reversed with respect to the variations described above.

A detection circuit that calculates the following equation and outputs the resultant as a detection result D may be prepared in order to extract, as an electric signal, the detected value of torque acting about the rotation axis (Z-axis) in the torque sensor having such a configuration.

$$D=(C1+C3)-(C2+C4)$$

In other words, the output of the detection circuit is the difference between the sum "C1+C3" of the capacitance value C1 of the first detection body 151 and the capacitance value C3 of the third detection body 153 and the sum "C2+C4" of the capacitance value C2 of the second detection body 152 and the capacitance value C4 of the fourth detection body 154.

For example, the action of clockwise torque on the outer support 120 as illustrated in FIG. 4 causes the capacitance values C1 and C3 to be increased and the capacitance values C2 and C4 to be decreased, as described above, and therefore allows the difference value "(C1+C3)−(C2+C4)" to be output as a positive value. In contrast, the action of counterclockwise torque on the outer support 120 causes the capacitance values C1 and C3 to be decreased and the capacitance values C2 and C4 to be increased, and therefore allows the difference value "(C1+C3)−(C2+C4)" to be output as a negative value. Accordingly, the sign of the difference value denotes the orientation of the acting torque, and the absolute value of the difference value indicates the magnitude of the acting torque.

Such difference detection is effective in reducing a detection error. For example, even when the change of a temperature environment results in expansion and contraction in each section of the basic structure 100, thereby changing the spacing between the electrodes of each capacitative element, an error occurring based on such a change of the spacing between the electrodes can be canceled out by the difference detection described above.

According to the present embodiment, the inner support 110 and the outer support 120 are connected through the plural connectors 130, as described above in detail. Moreover, the deformable bodies 141 to 144 are arranged in the spaces surrounded by the connectors 130 adjacent to each other, the inner support 110, and the outer support 120. Between the deformable bodies 141 to 144 and the outer support 120, the electrodes as the detection bodies 151 to 154 are disposed to face the deformable bodies 141 to 144 and the outer support 120. As a result, all the components can be arranged along a plane, and the slim torque sensor including a simple structure and having a reduced thickness can be achieved.

In the present embodiment, the inner support 110 and the outer support 120 are connected through the four connectors 130 equally arranged with respect to the Z-axis. As a result, the flat sheet-shaped basic structure 100 is inhibited from being deformed and can endure even relatively strong torque.

In the present embodiment, the inner support 110 and the outer support 120 are connected through the four connectors 130 equally arranged with respect to the Z-axis. As a result, force applied to the torque sensor is dispersed, thereby enabling force applied to each connector 130 to be reduced, and therefore, each connector 130 can be prevented from being damaged.

Embodiment 2

Figure 5:
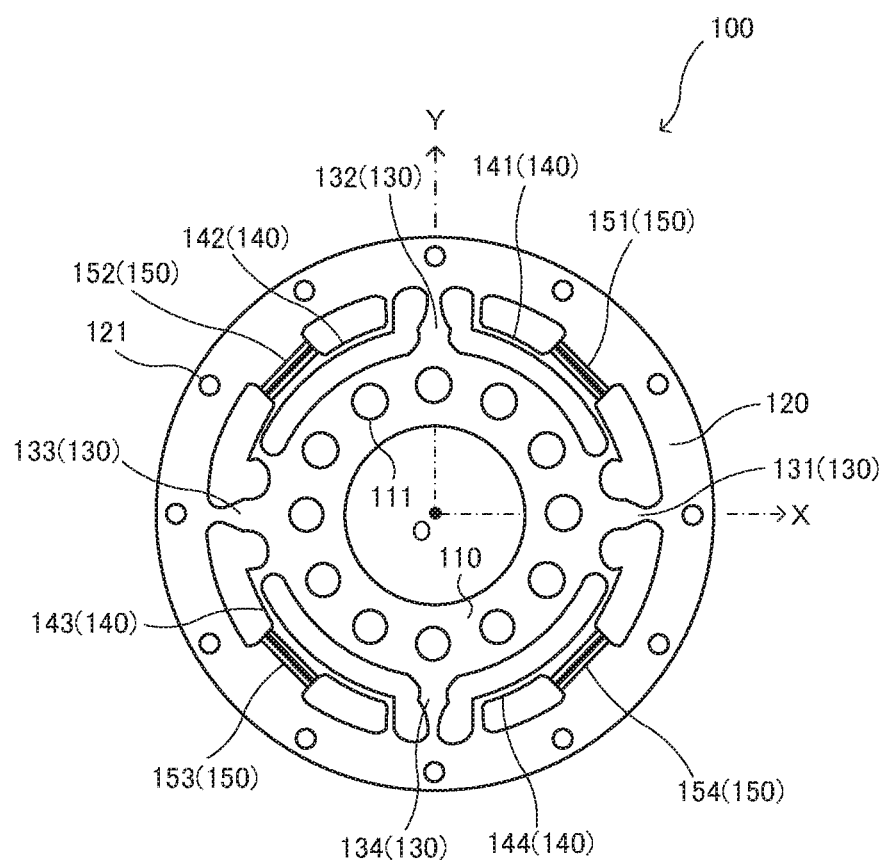
FIG. 5 is a top view of a torque sensor according to Embodiment 2 of the present disclosure.

Embodiment 2 of the present disclosure will now be described with reference to FIG. 5.

Each section of a basic structure 100 in a torque sensor according to the present embodiment is the same as that in the torque sensor according to Embodiment 1 described above. In the present embodiment, the shapes of connectors 131 to 134 are different from the shapes of the connectors 131 to 134 according to Embodiment 1 described above. In the present embodiment, in the connectors 131 to 134, the widths of connection portions to an outer support 120 in a rotation direction are smaller than those of the other portions.

Such a manner enables the basic structure 100 to be inhibited from being deformed against force acting to deform the flat sheet-shaped basic structure 100, and the deformation amounts of deformable bodies 141 to 144 can be allowed to be equivalent to those in the torque sensor of Embodiment 1 even when torque about the Z-axis, generated between the inner support 110 and the outer support 120, is relatively weak. Thus, the detection circuit applied to the torque sensor of Embodiment 1 can be used in the torque sensor of the Embodiment 2. In other words, commonality of the detection circuit in the torque sensor of Embodiment 2 and the torque sensor of Embodiment 1 can be achieved.

Portions in which the widths in the rotation direction are smaller than those in the other portions are not limited to the connection portions to the outer support 120, but may be formed on the midportions of the connectors 131 to 134, or may be formed on connection portions to the inner support 110.

The torque sensors according to Embodiments 1 and 2 described above have been described above. As a matter of course, the present disclosure is not limited to the embodiments.

For example, in the embodiments described above, the deformable bodies 141 to 144 include the protrusion bodies 141A to 144A, the protrusion bodies 141B to 144B, and the extension bodies 141C to 144C. However, the present disclosure is not limited thereto. The deformable bodies 140 need not include bent portions, but may be a member that is radially deformed when the point P1 or the like and the point Q1 or the like receive compressive force or tensile force.

For example, in Embodiment 1 described above, the detection bodies 151 to 154 (the displacing electrodes E11 to E14 and the fixed electrodes F11 to F14) are arranged on the outsides of the deformable bodies 141 to 144 in a radial direction. However, detection bodies (third electrode and fourth electrode) may be disposed between the inner sides of the deformable bodies 141 to 144 and the outer side of the inner support 110. Further, respective detection bodies can also be disposed on both the outer sides and inner sides of the deformable bodies 141 to 144.

A feature of the torque sensor according to each of the embodiments described above is in that all of the inner support 110, the outer support 120, the connectors 130, the deformable bodies 140, and the detection bodies 150 are arranged along the XY plane when being arranged so that the Z-axis of the XYZ three-dimensional orthogonal coordinate system is the rotation axis. In other words, all of the inner support 110, the outer support 120, the connectors 130, the deformable bodies 140, and the detection bodies 150 are arranged at positions including the XY plane (positions crossing the XY plane). Such an arrangement along the XY plane is important for achieving a slim torque sensor having a reduced thickness.

As is particularly clear from FIG. 1B and FIG. 1C, the torque sensor according to each of the embodiments described above includes the top surface of the outer support 120, located on a first plane represented by the equation (Z=+d), and the undersurface of the outer support 120, located on a second plane represented by the equation (Z=−d), in the XYZ three-dimensional orthogonal coordinate system. In addition, all of the inner support 110, the connectors 130, the deformable bodies 140, and the detection bodies 150 are housed in a space sandwiched between the first plane and the second plane, and are arranged along the XY plane which is a two-dimensional plane orthogonal to the Z-axis.

The adoption of such a configuration enables the thickness of an overall torque sensor (a dimension with respect to a Z-axis direction) to be reduced to a range of 2d or less, and can result in the achievement of the slim torque sensor including a simple structure and having a reduced thickness. As a matter of course, the arrangement of each of the detection bodies 151 to 154 at the above-described spatial position is sufficient in the principle of operation, and there is no harm to detection even in the protrusion of a part of each of the detection bodies 151 to 154 from the above-described space. However, the capacitative element included in each of the detection bodies 151 to 154 is also preferably housed in the above-described space in order to reduce the thickness of the overall torque sensor to a range of 2d or less to slim down the torque sensor.

In fact, when the torque sensor attached to a joint portion or the like of a robot arm is utilized, it is preferable to make some modifications to the top surface position and undersurface position of each section. For example, a case will be considered in which the torque sensor is inserted between the upper arm section and lower arm section of a robot arm, and the outer support 120 joined to the undersurface of the upper arm section arranged thereabove and the inner support 110 joined to the top surface of the lower arm section arranged therebelow are utilized. On the basis of the presumption of such utilization, it is preferable the top surface position of the outer support 120 is corrected at a flat surface position represented by the equation (Z=+d+δ1), and the undersurface position of the inner support 110 is corrected at a flat surface position represented by the equation (Z=−d−δ2), in FIG. 1B and FIG. 1C. Thus, a predetermined gap dimension δ1 between the top surface of the inner support 110 and the undersurface of the upper arm section is secured, thereby enabling useless contact between both to be avoided, and similarly, a predetermined gap dimension δ2 between the undersurface of the outer support 120 and the top surface of the lower arm section is secured, thereby enabling useless contact between both to be avoided.

As a matter of course, the gap dimensions δ1 and δ2 described above may be secured by disposing a level difference structure on the top surface of the outer support 120 (for example, forming an upwardly rising ridge on a part) or by disposing a level difference structure on the undersurface of the inner support 110 (for example, forming a downwardly rising ridge on a part). Such a manner enables useless contact to be avoided even when the torque sensor attached to a joint portion of a robot arm is utilized, although allowing the overall thickness to be slightly larger than 2d.

In each of the embodiments described above, the number of the connectors 130 is set at four. However, the present disclosure is not limited thereto. The number of the connectors 130 may be two, three, or five or more. In view of the dispersion of force, it is desirable to evenly arrange the connectors 130 with respect to the Z-axis.

Not only the rigidity of the torque sensor in the direction of rotation about the Z-axis but also the rigidity of the torque sensor in a Z-axis direction is increased by designing and adjusting, as appropriate, the widths of the connectors 130 in the direction of the rotation about the Z-axis, as well as the number of the connectors 130. As a result, not only the resistance of the torque sensor to force in the direction of the rotation about the Z-axis but also the resistance of the torque sensor to force along the Z-axis is also increased.

In the each of the embodiments described above, the number of the deformable bodies 140 is set at four. However, the present disclosure is not limited thereto. The number of the deformable bodies 140 may be two, three, or five or more. It is desirable to evenly arrange the deformable bodies 140 with respect to the Z-axis.

In each of the embodiments described above, for example, the inner support points P1, P2 and the outer support points Q1, Q2, and the inner support points P3, P4 and the outer support points Q3, Q4 are arranged at positions line-symmetric with respect to the X-axis. However, the present disclosure is not limited thereto. The inner support points P1 to P4 and the outer support points Q1 to Q4 may be arranged to be four-fold rotationally symmetric with respect to the origin point O.

In each of the embodiments described above, the first protrusion bodies 141A to 144A are arranged near the X-axis, and the second protrusion bodies 141B to 144B are arranged near the Y-axis. However, the present disclosure is not limited thereto. The first protrusion bodies 141A to 144A may be arranged near the Y-axis, and the second protrusion bodies 141B to 144B may be arranged near the X-axis.

In each of the embodiments described above, the capacitative elements are used as the detection bodies. However, the detection bodies according to the present disclosure may be elements having the function of detecting an elastic deformation generated in a deformable body in some way, and are not necessarily capacitative elements.

For example, strain gauges instead of the capacitative elements may be used as detection bodies (probes). Specifically, torque can also be detected by affixing strain gauges functioning as the detection bodies 151 to 154 between the deformable bodies 141 to 144 and the outer support 120, or between the deformable bodies 141 to 144 and the inner support 110 to electrically detect a variation in the resistance value of each strain gauge.

In practice, it is most suitable to use a capacitative element as a detection body according to the present disclosure. Such a capacitative element can include a simple electrode layer, and is therefore very inexpensive. In addition, use of such a capacitative element also enables a production process to be simplified. For example, in the case of Embodiment 1, the basic structure 100 may be generated as the integral structure of a metal, followed by performing the operation of affixing eight insulating substrates, on which electrode layers are formed, to predetermined places.

In the case of allowing the detection bodies to include the capacitative elements, the area of one of electrodes in a pair, facing each other, is preferably set to be larger than the area of the other. This is intended to maintain an effective facing area functioning as such the capacitative elements at a constant level even when the displacing electrodes slightly move in a rotation direction due to the action of torque, thereby resulting in the occurrence of the deviation between the relative positions of both the electrodes. The capacitance value of such a capacitative element depends on not only the distance between the electrodes, facing each other, in a pair, but also an effective facing area. Thus, more accurate detection is possible because the capacitance value depends only on the distance between the electrodes, when the area of one of the electrodes is set at a value greater than the area of the other, and the effective facing area is maintained at a constant level even if the positions of the displacing electrodes are changed to some extent.

In each of the embodiments described above, each electrode included in the capacitative elements includes a flat sheet-shaped electrode layer. However, such an electrode need not have a flat sheet shape, but may be curved to some extent. For example, FIG. 4 illustrates an example in which the flat sheet-shaped electrodes are used as all of the respective displacing electrodes E11 to E14 and the respective fixed electrodes F11 to F14. However, the respective displacing electrodes E11 to E14 may be allowed to have curved surfaces along the outer peripheral surfaces of the deformable bodies 140, and the respective fixed electrodes F11 to F14 may be allowed to have curved surfaces along the inner peripheral surface of the outer support 120.

In each of the embodiments described above, the four detection bodies 151 to 154 including the displacing electrodes E11 to E14 and the fixed electrodes F11 to F14 in respective pairs are included in the torque sensor. However, the present disclosure is not limited thereto. At least one detection body may be acceptable if the action of torque on the torque sensor about the rotation axis (Z-axis) is enabled to be detected (if the orientation and size of the torque are not detected).

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the priority of Japanese Patent Application No. 2016-253414, filed on Dec. 27, 2016, the entire disclosure of which is incorporated by reference herein.

INDUSTRIAL APPLICABILITY

The present disclosure can be applied to, for example, detection of torque between robot arms.

REFERENCE SIGNS LIST

100 Basic structure
110 Inner support
111 Hole for attachment
120 Outer support
121 Hole for attachment
130 Connector
131 First connector
132 Second connector
133 Third connector
134 Fourth connector
140 Deformable body
141 First deformable body
141A First protrusion body
141B Second protrusion body
141C Extension body
142 Second deformable body
142A First protrusion body
142B Second protrusion body
142C Extension body
143 Third deformable body
143A First protrusion body
143B Second protrusion body
143C Extension body
144 Fourth deformable body
144A First protrusion body
144B Second protrusion body
144C Extension body
150 Detection body
151 First detection body
152 Second detection body
153 Third detection body
154 Fourth detection body
E11 to E14 Displacing electrode
F11 to F14 Fixed electrode
H Hollow
P1 to P4 Inner support point (first position, point)
Q1 to Q4 Outer support point (second position, point)
R Circle

The invention claimed is:

1. A torque sensor that detects torque, about a rotation axis, generated between a first object and a second object, the torque sensor comprising:
a first support that supports the first object;
a second support that supports the second object, the second support being located outwardly from the first support with respect to a radial direction about the rotation axis and arranged across a space from the first support;
a sheet-shaped deformable body, the deformable body having one end connected to the first support at a first position with respect to a rotation direction about the rotation axis and another end connected to the second support at a second position different from the first position with respect to the rotation direction, and the deformable body being deformed in the radial direction by applying compressive force or tensile force between the first position and the second position;
a detection body that detects an elastic deformation generated in the deformable body, based on a characteristic value of either a probe disposed between the deformable body and the first support or a probe disposed between the deformable body and the second support; and a connector that is arranged between the first support and the second support and connects the first support and the second support.

2. The torque sensor according to claim 1, wherein the detection body comprises a capacitative element comprising either respective electrodes disposed to face the deformable body and the first support or respective electrodes disposed to face the deformable body and the second support, and detects an elastic deformation generated in the deformable body, based on a characteristic value of the capacitative element.

3. The torque sensor according to claim 1, wherein the deformable body comprises:
- a sheet-shaped first protrusion body that protrudes from a plane of the first support toward the second support, the plane of the first support facing the second support;
- a sheet-shaped second protrusion body that protrudes from a plane of the second support toward the first support, the plane of the second support facing the first support; and
- a sheet-shaped extension body that is connected to a leading end of the first protrusion body and a leading end of the second protrusion body and that is extended along the rotation direction of the rotation axis.

4. The torque sensor according to claim 3, wherein a width of the first protrusion body and a width of the second protrusion body each are less than a width of each connector with respect to the rotation direction.

5. The torque sensor according to claim 1, wherein the detection body comprises:
- a first electrode that is disposed on the deformable body; and
- a second electrode that is disposed on the first support to face the first electrode.

6. The torque sensor according to claim 1, wherein the detection body comprises:
- a third electrode that is disposed on the deformable body; and
- a fourth electrode that is disposed on the second support to face the third electrode.

7. The torque sensor according to claim 1, wherein the deformable body is arranged in a space surrounded by (i) the first support, (ii) the second support, and (iii) two connectors adjacent to each other of a plurality of the connectors.

8. The torque sensor according to claim 1, wherein the connectors each have a portion of which a width in the rotation direction is less than that of another portion, between a connection portion to the first support and a connection portion to the second support.

9. The torque sensor according to claim 1, wherein the first support, the second support, the connectors, and the deformable body are integrated into one member; and
respective outer edges of a portion that connects the first support and the connectors, a portion that connects the second support and the connectors, a portion that connects the first support and the deformable body, and a portion that connects the second support and the deformable body are formed to have an arc shape.

10. The torque sensor according to claim 1, wherein the first support, the second support, the connectors, the deformable body, and the detection body are arranged along a two-dimensional plane orthogonal to the rotation axis.

11. The torque sensor according to claim 1, wherein the deformable body comprises:
- a first deformable body that is orthogonal to the rotation axis and arranged in a first quadrant of a two-dimensional orthogonal coordinate system of which an origin point is a position of the rotation axis;
- a second deformable body that is arranged in a second quadrant of the two-dimensional orthogonal coordinate system;
- a third deformable body that is arranged in a third quadrant of the two-dimensional orthogonal coordinate system; and
- a fourth deformable body that is arranged in a fourth quadrant of the two-dimensional orthogonal coordinate system.

12. The torque sensor according to claim 11, wherein the detection body comprises:
- a first detection body that detects an elastic deformation of the first deformable body;
- a second detection body that detects an elastic deformation of the second deformable body;
- a third detection body that detects an elastic deformation of the third deformable body; and
- a fourth detection body that detects an elastic deformation of the fourth deformable body.

* * * * *